United States Patent [19]
Kirby

[11] 3,764,553
[45] Oct. 9, 1973

[54] REMOVAL OF RADIOISOTOPES FROM WASTE SOLUTIONS

[75] Inventor: Harold W. Kirby, Dayton, Ohio

[73] Assignee: The United States of America as represented by the United States Atomic Energy Commission, Washington, D.C.

[22] Filed: Aug. 18, 1972

[21] Appl. No.: 281,665

[52] U.S. Cl....... 252/301.1 R, 252/301.1 W, 423/6
[51] Int. Cl............................................ C01g 56/00
[58] Field of Search............ 252/301.1 W, 301.1 R; 423/6

[56] References Cited
UNITED STATES PATENTS
2,981,593  4/1961  Pagny ..................................... 423/6

FOREIGN PATENTS OR APPLICATIONS
42/8520  4/1967  Japan............................... 252/301.1

Primary Examiner—Carl D. Quarforth
Assistant Examiner—R. L. Tate
Attorney—Roland A. Anderson

[57] ABSTRACT

The invention comprises removing radioisotopes from waste liquids or solutions by passing these through filters and through a column containing a suitable salt of phosphoric acid.

3 Claims, 1 Drawing Figure

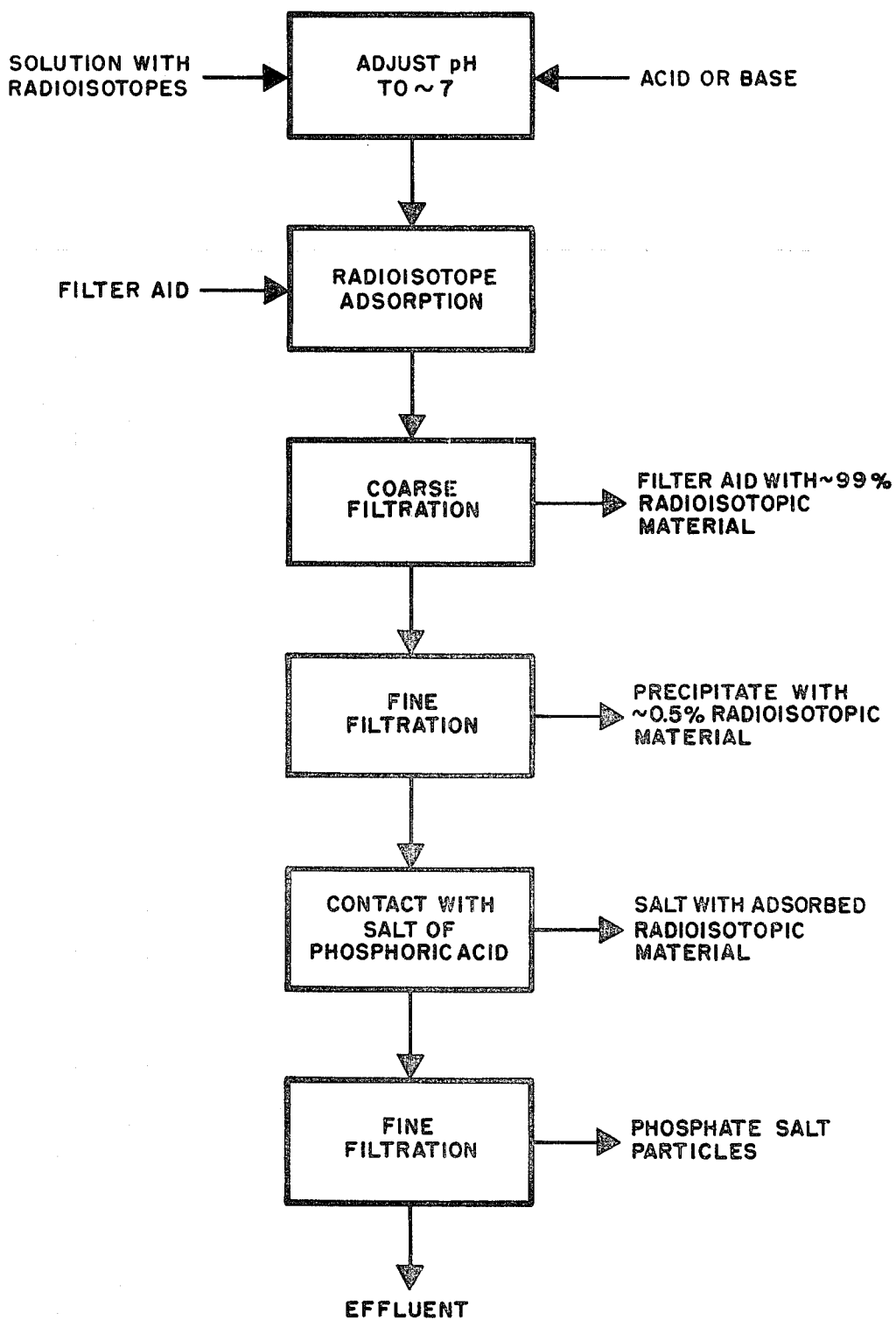

REMOVAL OF RADIOISOTOPES FROM WASTE SOLUTIONS

BACKGROUND OF INVENTION

Present day waste disposal processes of materials containing radioisotopes generally are those for specific isotopes. Increased use of nuclear power and nuclear power reactors creates increased quantities of radioactive liquid wastes with attendant growth of waste treatment and disposal problems. Indeed, the ecological trend is to reduce levels of radioactivity in liquid effluents from nuclear processing sites. With higher uses of nuclear production and lower contamination limits which are to be expected in the future, improved waste treatment methods are desirable or needed.

Although it is known that actinides such as actinium, thorium, protactinium, uranium, plutonium, as well as other radioisotopic materials can be precipitated as phosphate from acid or alkaline solutions, the addition of massive quantities of phosphates to waste disposal streams from nuclear processing facilities to precipitate these actinides also presents a problem to the environment by the added phosphate which promotes growth of algae and the like.

SUMMARY OF INVENTION

In view of the above-described needs and limitations to present processes, it is an object of this invention to provide a method for removing or separating radioisotopes from waste or other liquids or solutions, hereinafter generally referred to as solutions or waste solutions.

It is an object of this invention to provide a method of removing radioisotopic materials from waste solutions such as to result in a minimum amount of volume and a minimum amount of waste solution containing radioisotopic materials.

It is an object of this invention to provide a method of removing radioisotopic materials from waste solutions in the form of phosphates, which phosphates decompose with difficulty such that subsequent burial to dispose of said phosphates will carry a small likelihood that the radioisotopes will be leached out or removed from the compound.

It is a further object of this invention to reduce the cost of disposing of liquid waste solutions containing radioisotopic materials.

Various other objects and advantages will become apparent from the following description of this invention, and the most novel features will be pointed out with particularity hereinafter in connection with the appended claims. It is understood that various changes in the details, materials and process steps which are herein described and illustrated to better explain the nature of the invention may be made by those skilled in the art without departing from the scope of the invention.

The invention comprises, in brief, filtering waste solutions containing radioisotopes through appropriate filters and thereafter contacting the solutions containing or having the radioisotopes in reduced concentration with a suitable salt of phosphoric acid.

DESCRIPTION OF DRAWING

The drawing is a representative flow process suitable for effecting this invention.

DETAILED DESCRIPTION

Waste, or the like, liquids or solutions which contain radioisotopes may be processed by this invention to remove a substantial portion of the radioisotopes and lower the radioactivity to levels at which the solution may be disposed of in a conventional manner, such as by direct effluence into a body of water or a stream. The radioisotopic concentration which may be so processed may typically range from about 50 parts per billion to about 50 parts per million, or from about $10^3$ to about $10^6$ counts per minute per milliliter (c/m/ml).

As shown in the drawing, a waste solution containing a radioisotopic material may have the pH adjusted to about a pH of 7 with a suitable acid such as about 10 M muriatic acid, about 16 M nitric acid, or about 18 M sulfuric acid or, if required, a suitable base such as about 10 M sodium hydroxide. It is understood that the waste solution as is to be processed may already have a pH between about 3 and about 9 so that any adjustment may not be required. The acid or base concentration may be varied as desired to minimize the amount of solution which is added to achieve a pH of about 7. A suitable pH range to which the solution pH is adjusted may be from about 3 to about 9 pH and preferably between pH of 6 and 8. Excessive acidity, such as at pH less than 3 may dissolve the phosphate and excessive basicity, such as greater than pH 9 may precipitate the iron and clog the filter. The waste solution may result from chemical or other processing in quantities varying in relation to these processes, such as from small glovebox size operations, or from large scale plant operations in one or more close locations, or from centrally located large waste treatment centers.

A filter aid such as diatomaceous earth of primarily silica, or some other suitable filter aid such as fine sand, may then be added to the solution which has had the pH adjusted to adsorb the hydrolyzed radioactivity. The amount of diatomaceous earth or other type of filter aid which is added may be dependent upon the concentration of the radioisotopic material as well as the quantity of liquids being processed. For example, a suitable quantity which has been used is about 1 kilogram of diatomaceous earth per about 500 gallons of waste solution containing up to about 50 parts per million of radioisotopic materials. Typical particle size of the filter aid used may range from about 50 to about 200 standard U.S. mesh size, such that adsorbed radioisotopic material is contained within a minimum amount of volume.

The waste solution which now contains a diatomaceous earth or other filter aid may then be filtered through a first or coarse type of filter means comparable in porosity to a qualitative, open texture grade of filter paper (such as Whatman No. 4). The precipitate or diatomaceous earth or other filter aid which is removed or separated by the filtration process in general will contain from about 95 to about 99 percent of the radioisotopic material in the original solution. The precipitate containing this percentage of radioisotopic material may then be processed for appropriate disposal procedures such as calcining or solidification with concrete.

The coarse filtration step may use filter means which have a pore or opening size ranging from about 1 to about 100 microns and preferably between about 10 and about 25 microns. In addition to the use of Whatman filter paper, other suitable filters which may be used are sintered glass, sintered metals, etc. A subsequent fine filtration means may be used to filter the filtrate of the coarse filtration, and the fine filtration means used may have pore or opening size ranging from about 0.2 to about 5 microns and preferably about 1 microns and may use other suitable filters as listed hereinabove. The diatomaceous earth or other filter aid which is added is intended to adsorb a majority of the activity containing radioisotopic material and facilitate removal of the same from the waste or other solution. The subsequent fine filtration step may remove from about 0.5 percent to about 4.5 percent of the radioisotopic material in the original solution depending on degree of radioisotopic content, type of radioistope, etc. The precipitate removed may be processed as after the coarse filtration step.

The solution resulting from this second filtration with the above cited filter means is then placed in contact with a calcium phosphate ($Ca_3(PO_4)_2$) or calcium hydrogen phosphate ($CaHPO_4$) compound or salt, or other suitable insoluble salt of phosphoric acid. Contact may be effected by allowing this solution to flow through, or permeate, the calcium phosphate or calcium hydrogen phosphate contained in a column in the form of a fine powder or by mixing the solution with the phosphate in a tank. Suitable powder sizes range from about 5 to about 100 microns generally. Since smaller particles per given volume present a greater surface area, it may be preferred to use a packing material such as calcium phosphate, calcium hydrogen phosphate or ground phosphate rock (that is, calcium phosphate) which is of small diameter. Although the salts calcium phosphate and calcium hydrogen phosphate are referred to herein, the use of other salts of phosphoric acid in this process is not to be excluded. Other salts of phosphoric acid which may be used are such as the phosphates of the alkaline earth and rare earth elements — the selection of the particular phosphate to be determined from all considerations including cost. Barium phosphate, strontium phosphate, lanthanum phosphate, cerium phosphate, and thorium phosphate, as well as ground phosphate rock are examples of some of the phosphates which may be used.

Contact made of the suitable salt of phosphoric acid with the waste solution by flowing or permeating the waste solution through this salt (which salt may be in the form of a packing material in a column or the like) or by mixing in a tank results in metathesis and adsorption of the radioisotopic material onto the salt. Since any of the aforementioned salts of phosphoric acid may be disposed in any suitable housing means, it may be preferred to place the salt in a packed arrangement within a removable column through which the effluent is to pass. Use of a removable column containing the phosphate permits rapid removal and replacement of the exhausted or used up salt.

The effluent or waste solution which passes through the suitable salt of phosphoric acid may be filtered through a subsequent filter means having the same or similar opening or pore size as the filter means used in the second filtration, that is, a pore size or opening size ranging from about 0.2 microns to about 5 microns. The purpose of this subsequent filtration step is to remove any particles of phosphate salts that may have been carried over from the column into the waste solution. Although this step is included in a preferred process sequence as shown in the drawing, the last filtration step may be eliminated since calcium phosphate, calcium hydrogen phosphate, or other like phosphate salts are insoluble in water such that little phosphate may be added to the effluent.

The above described process for removing radioisotopic materials from waste solutions or other solutions is not intended to exclude variations of said process. For example, after the initial pH adjustment to about 7, the waste solution may be contacted with the phosphate salt which may be calcium phosphate, calcium hydrogen phosphate, or the like to remove a large proportion of the radioisotopic material. This abbreviated process may be sufficient depending upon the quantity of radioisotopic material in the solution and the type of radioisotopic material within the waste solution or effluent. It may also be desirable to include only the initial coarse filtration and not to utilize subsequent filtration steps as described in the drawing and in the preceding drawing description. The effluent from the second fine filtration step, that is, from the filtration step after the contact with the phosphate salt, may be of sufficient purity to allow or permit it to flow into streams or other bodies of water. Examples of experiments which have used variations of the above described procedure follow.

Example 1

A two milliliter sample of one gallon of waste solution which had been received for waste disposal was counted by radio analysis and was found to contain 5681.2 alpha c/m/ml. Radio analysis revealed the presence of plutonium-238 and polonium-210. The pH of the waste sample was approximately 7. The sample was passed through a column of calcium hydrogen phosphate without further treatment. This column of calcium hydrogen phosphate was about 2.5 inches in height and about 5/8 of an inch in diameter. The phosphate powder ranged in size from about 1 micron to about 5 microns. Radio counting revealed that the effluent of the waste sample passed through the column contained about 8.7 alpha c/m/ml, indicating that 99.8 percent of the alpha activity was removed in the calcium hydrogen phosphate column.

Example 2

Another sample having an initial alpha count of 5681 c/m/ml was processed through successive filtration steps in accordance with this invention, the respective steps resulting in activity levels as given in the following table:

| Filter | Filtrate alpha c/m/ml | |
|---|---|---|
| Starting Material | 5681 | |
| Contacted with diatomaceous earth and filtered using Whatman No. 4 filter paper | 1216 | 1216 |
| Contacted with diatomaceous earth and filtered using Whatman No. 42 filter paper | 36 | |
| Sand: First ten ml of waste solution | | 128 |
| Second ten ml of waste solution | | 9 |
| Third ten ml of waste solution | | 6 |
| Fourth ten ml of waste solution | | 5 |
| Unfired vycor (325 mesh) | | 5 |
| Calcium phosphate — powder — about 5 microns diameter | | 1.5 |

Example 3

The process of Example 3 was repeated using a different sample of radioactive waste. After passing the sample through a column of calcium phosphate powder having the powder size ranging from about 1 micron to about 5 microns, the effluent water contained 0.8 alpha c/m/ml.

Example 4

Waste water was processed again only through the filtration steps of the described process. A test run was made with 500 gallons of waste solution which had about 44,000 c/m/ml and which had had its pH adjusted to about 7. One kilogram of diatomaceous earth filter aid was added to the tank, and the water was agitated and filtered; the filtrate was recycled to the original tank; samples were taken at hourly intervals and counted in the liquid scintillation counter. After three hours, the radioactivity had dropped to 11 c/m/ml. but it rose to 52 c/m/ml in the next three hours because of leaching of the radioactivity already adsorbed on the filter aid and remained essentially constant during the three hours thereafter.

Although the mechanism by which adsorption occurs onto the filter aid is not fully understood, it is believed that the radioisotopic material, such as plutonium, may be in a colloidal polymeric state at pH near 7 and may therefore be removed largely by adsorption and filtration. Nevertheless, our invention is not to be understood to be limited to this particular theory.

The use of extensive filtering permits the rapid use or loading of the phosphate salts in the cartridge or container in which they may be placed. As stated previously, the calcium phosphate or calcium hydrogen phosphate or other suitable phosphoric acid salt may be contained in a replaceable cartridge or cartridges which may be removed from the process when they become loaded and either dried or calcined before burial. Since the phosphates of the actinides and other radioisotopic materials are decomposed with difficulty, the process offers a means of disposing of unwanted radioelements in a compact form with small likelihood that the radioisotopes will be leached out after burial.

The temperature at which the waste solution is processed through the calcium phosphate or calcium hydrogen phosphate column may be from about 50° to about 90° F and preferably from about 70° to about 75°F. The efficiency of removal of the nuclide or radioisotope per phosphate ion may range from about 99.9 percent to about 99.99 percent. A method suitable for determining when the calcium phosphate or other phosphate column is fully loaded or exhausted may be such as the reappearance of significant radioactivity in the effluent. The treated liquid from which radioisotopes such as plutonium, polonium, actinium, thorium and other nuclides have been removed may be clean enough to permit its being recycled through the process or discharged as clean effluent to local streams or waterways. The phosphate, contaminated with the radioactive materials it has removed, may then be readily disposed of as stable low volume solids, or reprocessed to recover the nuclides which may have been collected.

This process is applicable to any nuclide precipitable by phosphate ion generally at a pH of from about 3 to about 9 and including all transition elements. Examples of exceptions are such as cesium-137 and other alkali metals, iodine-131 and other halogens, krypton-85 and other noble gases. This invention may be used to effect removal of actinium, thorium, protactinium, uranium and plutonium radioisotopes from waste or the like solutions. It is to be understood that the ground phosphate rock which may be used here is essentially calcium phosphate which may also have some calcium fluoride that may be beneficial to the process of this invention such that removal of the fluoride may not be required.

I claim:

1. A method to remove radioisotopic material taken from the group consisting of actinium, thorium, protactinium, uranium and plutonium isotopes, said radioisotopic material having a concentration ranging from about $10^3$ to about $10^6$ counts per minute per milliliter, from waste solutions containing said isotopes at temperature of from about 50°F to about 90°F comprising; adjusting the pH of the solution to from about 6 to about 8, adding a filter aid taken from the group consisting of diatomaceous earth and silica having a size from about 50 to 200 Standard U.S. mesh to said waste solutions, and thereafter filtering said solutions through from about 1 to about 100 microns opening filter means to separate said filter aid with adsorbed radioisotopic material from said solution thus removing from about 95 percent to about 99 percent of said radioisotopic material from said solution, and thereafter contacting said solution with a phosphoric acid salt solid powder of size from about 5 microns to about 100 microns, which is insoluble in water taken from the group consisting of calcium phosphate, calcium hydrogen phosphate, barium phosphate, strontium phosphate, lanthanum phosphate, cerium phosphate, thorium phosphate, as well as ground phosphate rock and mixtures thereof, said phosphoric acid salt having a radioisotopic material removal efficiency of greater than about 99.9 percent per phosphate ion.

2. The method of claim 1 together with, prior to said contacting, and after said filtering, additionally filtering said solution through a from about 0.2 to about 5 microns opening filter means to further separate said insoluble filter aid from said solution thereby removing from about 0.5 percent to about 4.5 percent of the radioisotopic material in said solution.

3. The method of claim 1 together with disposing said phosphoric acid salt within a removable container to facilitate removal and replacement of said salt.

* * * * *